(12) United States Patent
Sproat et al.

(10) Patent No.: US 7,649,883 B2
(45) Date of Patent: *Jan. 19, 2010

(54) NETWORK SERVICE PROVIDER ARCHITECTURE IN COMMUNICATIONS NETWORK

(75) Inventors: Martin Sproat, Stevenage (GB); Bruce Leigh Townsend, Ottawa (CA); Julian Frank Barry Cable, Bishops Stortford (GB); Simon Daniel Breuckheimer, London (GB); Stephen Rylant Evans, Welwyn Garden City (GB); Stephen L Fagg, Harlow (GB); Michael Flynn Thomas, Plano, TX (US); David John Stacey, Stanstead Abbots (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1183 days.

This patent is subject to a terminal disclaimer.

(21) Appl. No.: 10/656,554

(22) Filed: Sep. 5, 2003

(65) Prior Publication Data

US 2004/0042480 A1 Mar. 4, 2004

Related U.S. Application Data

(63) Continuation of application No. 09/218,111, filed on Dec. 21, 1998, now Pat. No. 6,643,297.

(51) Int. Cl.
*H04L 12/28* (2006.01)
*H04J 3/16* (2006.01)
*H04J 3/24* (2006.01)

(52) U.S. Cl. .................. 370/390; 370/432; 370/474

(58) Field of Classification Search .............. None
See application file for complete search history.

(56) References Cited

U.S. PATENT DOCUMENTS

| 6,026,442 | A  | * | 2/2000 | Lewis et al. ............. 709/229 |
| 6,181,702 | B1 | * | 1/2001 | Egbert .................... 370/401 |
| 6,262,992 | B1 | * | 7/2001 | Nelson et al. ............ 370/426 |
| 6,424,627 | B1 | * | 7/2002 | Sorhaug et al. .......... 709/224 |
| 6,643,297 | B1 | * | 11/2003 | Sproat et al. ............ 370/498 |
| 2003/0012196 | A1 | * | 1/2003 | Ramakrishnan ......... 370/390 |

* cited by examiner

*Primary Examiner*—Steven H Nguyen
(74) *Attorney, Agent, or Firm*—Barnes & Thornburg LLP

(57) ABSTRACT

An improved architecture in a circuit switched communications network is provided in which a plurality of network service provider devices, eg intelligent peripherals are arranged to provide network service data to a plurality of time division multiplex circuits and trunks by converting these circuits and trunks to streams of packets, and providing network service data packetized in a set of network service data packet streams to the circuit packet streams without incurring delays to the circuit packet streams. The circuit packet streams may be duplicated and forwarded to the network service provider devices without incurring delay to the ongoing through put packetized circuits, and similarly packet streams containing network service data may be superimposed into the circuit packet streams, without the requirement for the circuit packet streams to be switched to the network service provider devices. The architecture comprises a plurality of TDM interfaces, a plurality of conversion means for converting from time division multiplexed mode to a plurality of packet streams; a plurality of packet streams switching devices and a plurality of network service provider devices.

42 Claims, 9 Drawing Sheets

NETWORK SERVICE PROVIDER ARCHITECTURE IN COMMUNICATIONS NETWORK

RELATED APPLICATION

This application is a continuation of U.S. patent application Ser. No. 09/218,111, filed Dec. 21, 1998, now U.S. Pat. No. 6,643,297.

FIELD OF THE INVENTION

The present invention relates to the provision of network services, and particularly although not exclusively to the provision of network services in circuit switched communications networks.

BACKGROUND TO THE INVENTION

Prior art time division multiplexed (TDM) telephone systems provide network services to individual calls by internally redirecting those calls within an exchange to one or more individual network service provider equipment items which may be co-located in the exchange, either within a switch, or within a rack or row of racks associated with a switch. Network service provider devices provide services to calls passing through an exchange. Such devices may include network announcers, intelligent peripheral devices, universal tone receivers (UTRs) and universal tone generators (UTGs). Network announcers may comprise simple announcement devices for sending messages such as "all international lines are busy" or the like. Such machines have historically developed from simple analogue devices for playing pre-recorded messages, more recently to digital devices for playing pre-stored messages. A universal tone generator provides dial tones to a call, and a universal tone receiver detects tone dial digits from a call.

Referring to FIG. 1 herein, there is illustrated schematically a general architectural overview of a prior art exchange comprising a conventional prior art TDM switch 100, a network announcer device 101, an intelligent peripheral device 102, and a universal tone receiver/universal tone generator (UTR/UTG) device 103. Typically, network service provider components 101-103 may be co-located with the TDM switch within an exchange building in an array of racks as illustrated schematically in FIG. 2 herein. A conventional circuit switched TDM call comprises first and second channels between an originating source device, eg a first telephone device, and a receiving destination device, eg a second telephone device. Each circuit carries traffic data, eg voice or fax/modem traffic data in a first direction on the first channel from the first device to the second device and in a second direction on the second channel from the second device to the first device. A call on an incoming (originating) TDM circuit or trunk may be received by TDM switch 100 at an input port 104 of the switch, routed through the switch via one or more network service provider devices associated with the switch and routed through an output port 105 of the switch. Network services are provided by network service modules comprising for example the network announcer, intelligent peripheral, or UTR/UTG.

In the conventional network, such network services are required at many points in the network. For example in prior art legacy networks, when a number is dialed, parts of the number are echoed from exchange to exchange across the network. Each exchange in a path has to separately recognize it's portion of the dialed number and route the call on that basis. This process incurs delays at every exchange the call passes through. In legacy networks, it is common that some types of service provider for example the UTR/UTG are provided at each exchange in the network, whilst other types of service provider eg the network announcer or intelligent peripheral may appear only at specified places in the network and not on every exchange.

In each case, in prior art legacy networks the network service provider comprises a discrete card or rack of equipment within an exchange. The exchange, when it receives a call either directly from a subscriber or from an incoming trunk recognizes dialed digits or an off-hook signal, and internally switches the call to an appropriate service provider component. This incurs delays throughout the network.

Referring to FIG. 3 herein, there is illustrated components of an exchange which detect a call and connect the call to a UTR and UTG. As a call is built up from originating source to destination, when a phone 300 goes off hook, a seize detect element 301 of a local exchange 302 detects that the phone has gone off hook. This causes an electronic connection of the call to a universal tone generator 303 which applies a dial tone back to the call.

In the prior art switches, the whole call must be switched entirely through the internal switch network. Each switch takes time to re-direct the call to the appropriate network service provider component. In practice, the physical media used to connect each rack and component is electrical or optical cabling using T1/E1 or higher rate trunks. Where higher rates are used there is an inefficiency in re-multiplexing the data to a higher rate and then de-multiplexing data within the relevant service provider function. Normally, the whole speech path of a call has to be passed to the relevant service provided component and that component then has to pass the speech path back to the switching fabric of the switch for completing a path to the outgoing trunk, thereby incurring delays at the switch in connecting a call to the network service provider devices.

SUMMARY OF THE INVENTION

One object of the specific implementations of the present invention is to avoid the delays associated with switching of a complete call through an internal switching network when providing network services.

Another object of specific implementations of the present invention is to avoid rebuilding internal switch paths for provision of network services to a call.

According to one aspect of the present invention that is provided a circuit switched communications nodal architecture capable of providing a plurality of network services to a plurality of time division multiplexed channels, said architecture comprising:

a plurality of conversion means for converting a plurality of said time division multiplex channels to a plurality of packet stream channels;

a plurality of interface means for interfacing between said plurality of time division multiplexed channels, and said plurality of conversion means;

a plurality of switching means each capable of switching said packet stream channels over a plurality of through connections through said switching means; and a plurality of peripheral devices, each capable of providing network service signals; wherein each said peripheral device communicates with at least one said through connected channel by means of at least one further connecting channel connecting said through connected channel and said peripheral device.

The through connected channel preferably extends directly through said switching means without being routed through a said peripheral device.

The connecting channel preferably comprises at least one packet stream passing between the through channel and said peripheral device.

The connecting channel preferably carries data duplicated from said through connected channel, said duplicated data being transmitted to said peripheral device.

Traffic data carried on a said through channel may be replicated and broadcast to a plurality of said peripheral devices.

A time division multiplexed circuit comprising first and second channels may be converted by said conversion means into first and second packet stream channels, and each of said first and second packet stream channels maybe replicated to produce first and second replicated packet stream channels which are communicated to a said peripheral device.

A said peripheral device may comprise a network announcer device, a universal term receiver device, a universal term generator device, an intelligent peripheral device, or a like device capable of providing network service data to a one or a plurality of communications circuits extending across the circuit.

According to a second aspect of the present invention there is provided a method of providing network services to a communications circuit between a source device and a destination device, said circuit having a time division multiplexed channel portion, said method comprising the steps of:

converting said time division multiplexed channel portion of said circuit to at least one packet stream channel;

passing said packet stream channel through at least one switch fabric; and providing a connecting channel between said through packet stream channel and a network service provider device, for communicating data between said packet stream channel and said network service provider device.

Said method preferably comprises the step of duplicating a stream of packets carried on said through packet stream channel; and supplying said duplicated packets to said network provider device via said connecting channel.

Said method may further comprise the steps of;

generating service data at said service provider device;

incorporating said service data into a plurality of packets;

incorporating said packetized service data into a channel of said circuit.

Said method may comprise the steps of;

generating service data;

incorporating said service data into a plurality of packets;

sending said packetized service data over said connecting channel connecting an end to end channel of said circuit between a source device and said destination device with a said network service provider device.

Said method may comprise the steps of;

replicating a set of data packets comprising said through channel; and supplying said stream of replicated data packets to a said network service provider device.

According to a third aspect of the present invention there is provided a method of providing services to a plurality of communications circuits carrying traffic data, each said circuit comprising a time division multiplexed portion and a packetised portion, said method comprising the steps of;

converting said traffic data from a time division multiplexed mode to a packetized mode;

inputting a stream of packets containing said traffic data to a switching element;

transporting said packet stream across said switching element over a direct channel between an input and an output of said switching element;

generating a service data packet stream containing service data providing a network service;

inputting said service data packet stream to said switch element; and incorporating said service data packets into said packet stream containing service data.

The invention includes an exchange apparatus in a communications network, said apparatus capable of providing network services to a plurality of communications circuits, said exchange apparatus comprising;

a switch element; and at least one network service provider device capable of generating network service data, wherein said switch element is capable of replicating a data carried on said circuit and directing said replicated data to said network service provider device, and said switching means is capable of incorporating service data generated by said service provider device into said communications circuit.

The exchange apparatus preferably further comprises conversion means capable of converting between a time division multiplexed signal channel of a said communications circuit and a packet stream signal channel of said communications circuit.

A said switch element preferably comprises a plurality of inputs and outputs, and is adapted to carry said communications circuit directly across said switch between a said input and a said output, said service data being incorporated into said communications circuit between said input and said output.

A said switch element preferably has a plurality of inputs and outputs, and is adapted to transfer said communications circuit between a said input and a said output in the form of a stream of packetized signals, wherein said switch element operates to replicate the said stream of packetized signals and route said replicated packetized stream to a said service provider device.

According to a fourth aspect of the present invention there is provided a circuit switch communications network comprising:

a plurality of switch fabrics;

a plurality of network service provider devices;

a plurality of conversion means converting between a time division multiplex mode and a packet stream mode;

a time division multiplexed access network;

wherein said communications network is architecturally arranged such that said plurality of switch fabrics are distributed at a plurality of geographically disparate sites;

said plurality of network service provider devices are arranged amongst said plurality of geographically separated sites;

a plurality of end to end through circuits are created across said communications network each said through circuit having a time division multiplexed portion and a packet stream portion;

said plurality of conversion means operate to convert between said time division multiplexed access portions and said packet stream portions; and a said through circuit communicates with a said network service provider device by means of a connecting channel between said through circuit and said network service provider device.

The invention includes a circuit switched communications network capable of providing a plurality of network services to a plurality of time division multiplexed channels, said communications network comprising:

a plurality of conversion means for converting a plurality of said time division multiplex channels to a plurality of packet stream channels;

a plurality of interface means for interfacing between said plurality of time division multiplexed channels, and said plurality of conversion means;

a plurality of switching means each capable of switching said packet stream channels over a plurality of through connections through said switching means; and a plurality of peripheral devices, each capable of providing network service signals; wherein each said peripheral device communicates with at least one said through connected channel by means of at least one further connecting channel connecting said through connected channel and said peripheral device.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
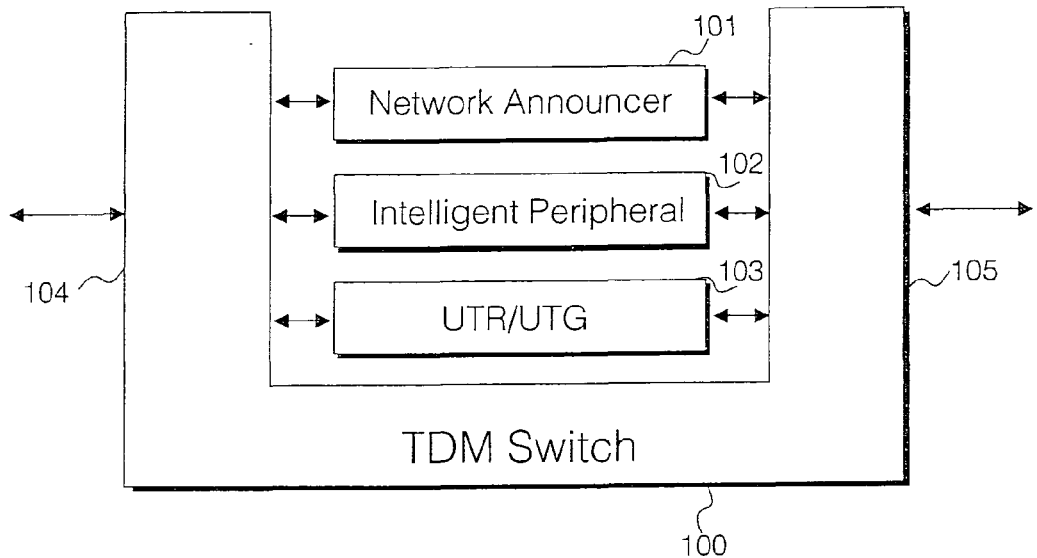
FIG. 1 illustrates schematically a general architectural overview of a prior art exchange.
Figure 2:
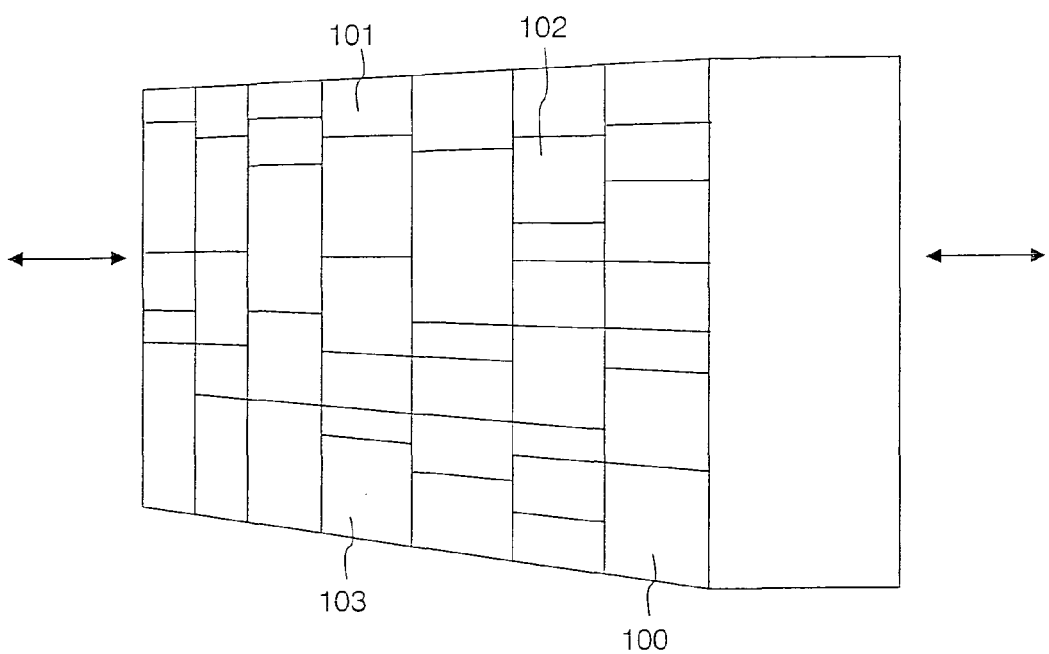
FIG. 2 illustrates schematically network service provider components co-located with a TDM switch within an exchange building in an array of racks.
Figure 3:
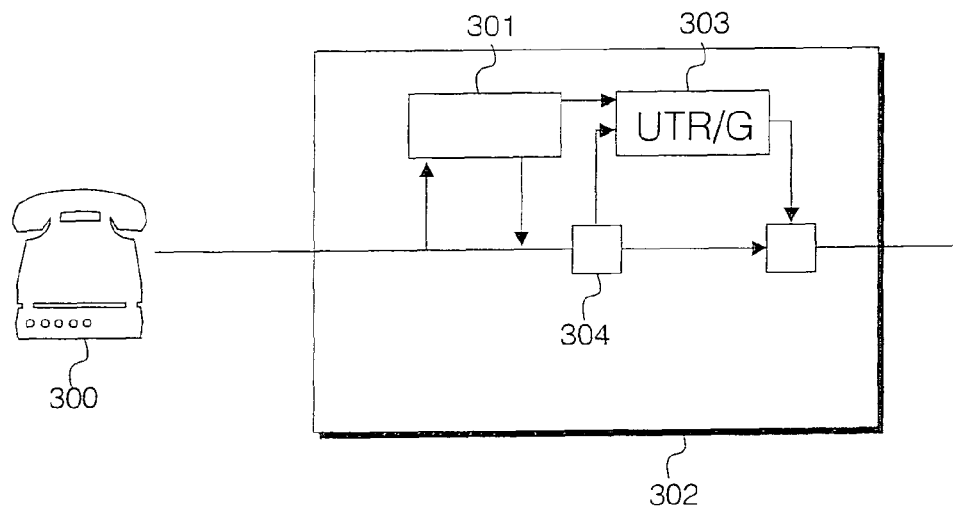
FIG. 3 illustrates components of an exchange which detect a call and connect the call to a UTR and a UTG.
Figure 4:
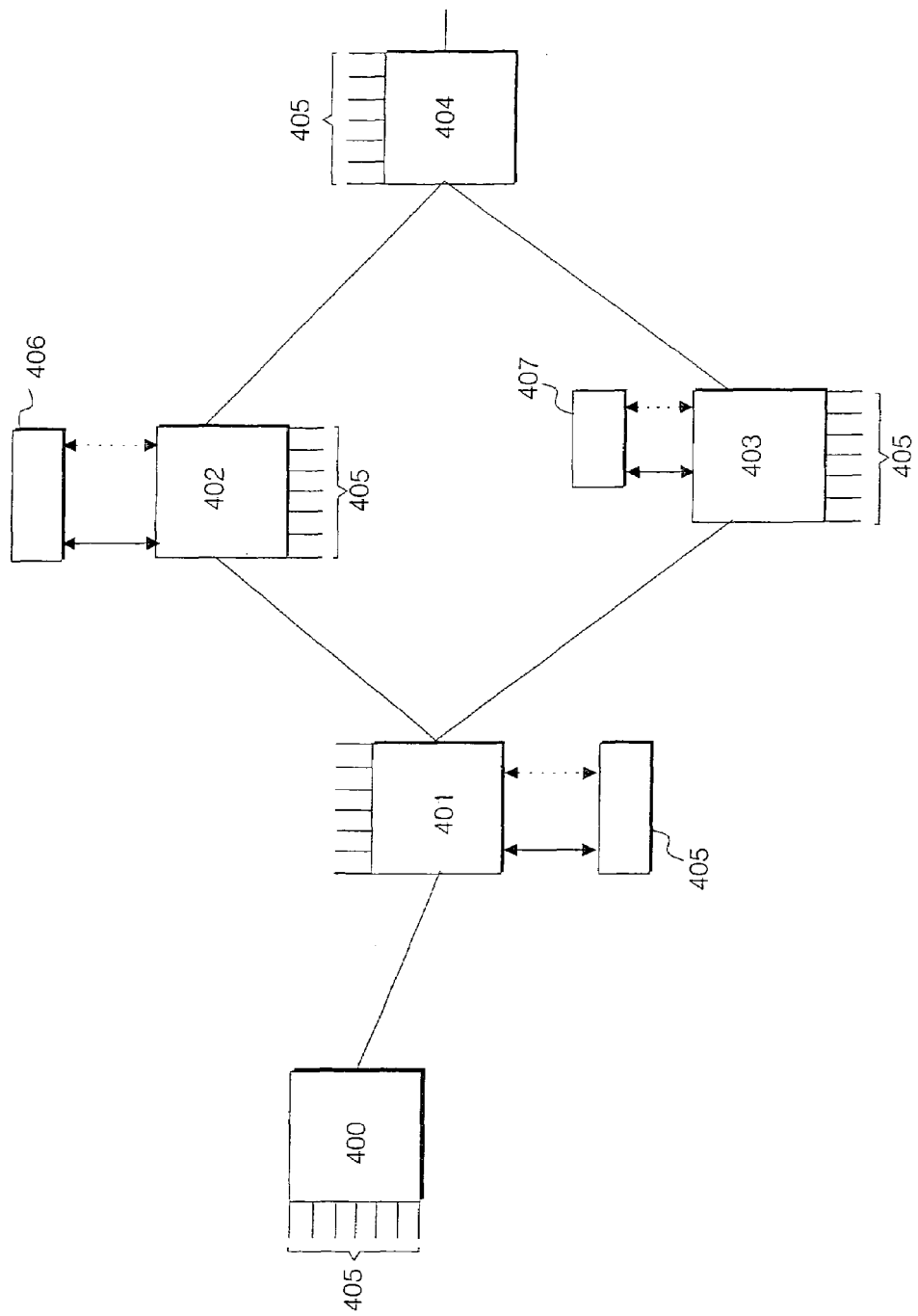
FIG. 4 illustrates schematically a portion of a generalized communications network architecture according to a first specific implementation of the present invention.

Referring to FIG. 4 herein, there is illustrated schematically a portion of a generalized communications network architecture according to a first specific implementation of the present invention. The network architecture comprises a plurality of interconnected exchanges 400-404 each having at least one switching device an access network comprising a plurality of time division multiplexed access circuits or channels 405, connected with each switching device; and a plurality of network service provider devices 405-407 comprising for example one or a plurality of network announcer devices, one or a plurality of intelligent peripheral devices, one or a plurality of universal tone receivers, and one or a plurality of universal tone generator devices. In the general case, each of the switches may be located at a separate site, geographically separated from other sites, and the network service provider devices may be distributed across the network arbitrarily at any site, co-located with the switches, or at their own specific sites. However, in the best mode herein, in practice one or more switching devices located at each of the exchanges are located on cards stored on shelves of racks, and the network service provider devices are co-located with switch devices on adjacent cards, in adjacent shelves or racks connected to a switch by a common backplane.

A plurality of end to end circuits extend across the network between a plurality of source devices, eg telephones, faxes, modems, or the like and a plurality of corresponding destination devices, eg telephones, faxes, modems or the like. Each circuit extends through a pair of time division multiplexed access channels in the access network on an originating side of a circuit, through at least one said switching means, and through a pair of time division multiplexed access channels on a destination side of the circuit. Each pair of channels comprising the circuit is converted between a time division multiplexed mode and a packet stream mode between the source and destination devices. Circuits are connected directly on an end to end basis between a corresponding source and destination, without being routed through any of the peripheral network service provider devices, but are provided with network services by the network service provider devices by means of additional connecting channels between the end to end through circuits, and one or a plurality of said peripheral network service provider devices.

In the best mode specific implementation described herein, the switches comprise asynchronous transfer modes (ATM devices) however, in general, the invention encompasses implementations comprising any type of switch capable of making circuit switched connections for transport of packets.

In this specification, by the term "packets" it is meant any cell, frame or packet of pre-defined or indeterminate length comprising a header portion containing address information, and a data payload portion containing data traffic. Examples of packets include ATM cells. The term "data traffic" includes data selected from the set: voice data, computer generated data, and video data.

Figure 5:
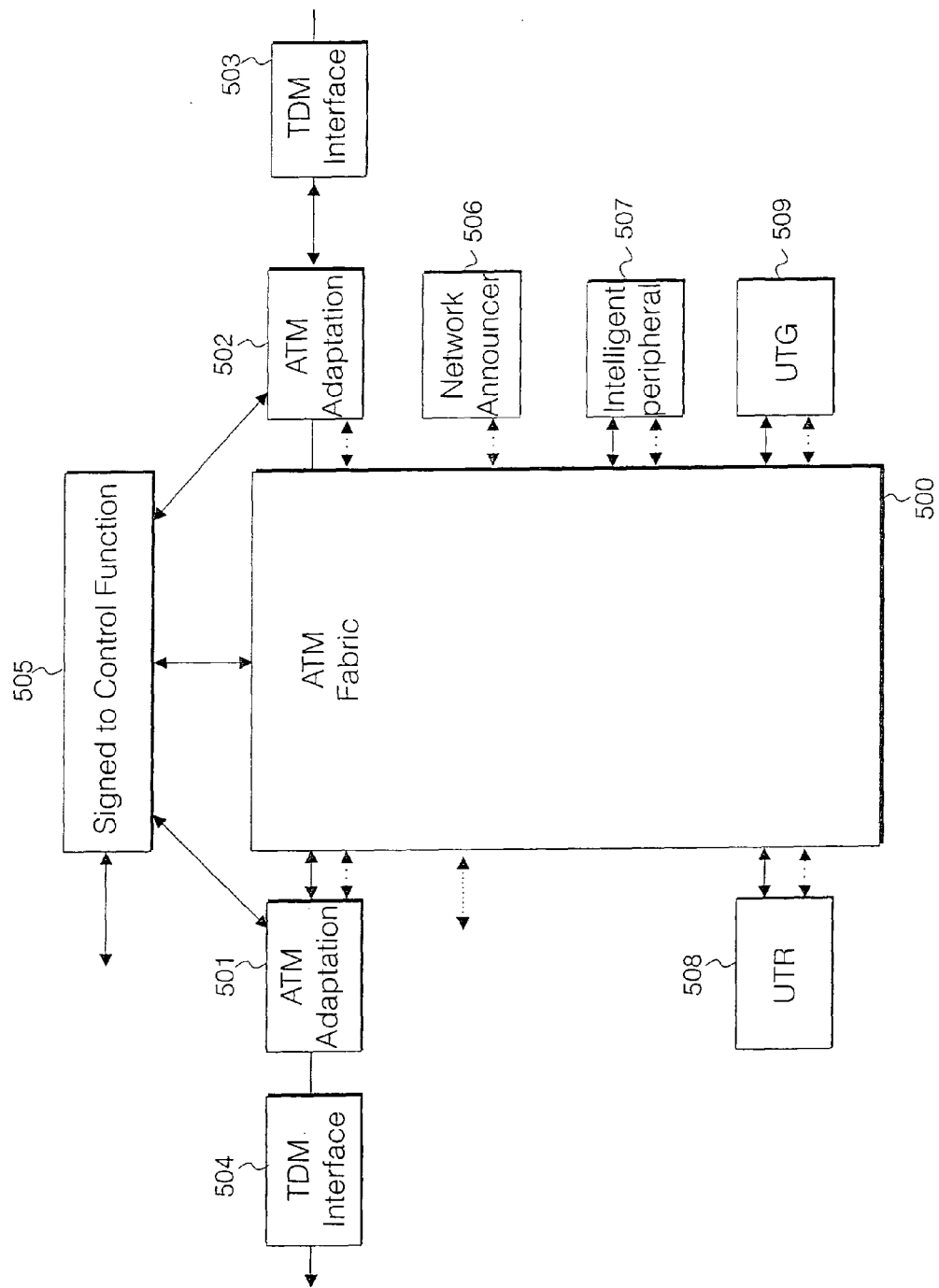
FIG. 5 illustrates schematically an exchange comprising a switching element and a plurality of network service provider devices, according to a second specific implementation of the present invention.

Referring to FIG. 5 herein, there is illustrated schematically an exchange comprising an ATM switch with a plurality of associated network service provider devices arranged according to the architecture subject of the specific implementation of the present invention. The exchange comprises an ATM fabric 500; an ATM backplane to which the ATM switch fabric is connected (backplane not shown in FIG. 5); first and second ATM adaptation devices 501, 502; first and second time division multiplex interfaces 503, 504 for interfacing a plurality of TDM circuits and/or trunks of an access network with first and second ATM adaptation devices 501, 502 respectively; control signaling means 505 for controlling connections across the ATM switch fabric 500; and a plurality of network service provider devices comprising for example network announcer 506; intelligent peripheral 507; universal tone receiver 508; and universal tone generator 509. Network announcer device 506 operates to generate network announcements upon input of ATM cells directed to the network announcer. Announcements can be made bi-directionally to a call, in either direction of the call, either to an originating call side or an outgoing call side depending upon the type of announcement activated. The intelligent peripheral device 507 may comprise a voice processing device. Intelligent peripheral 507 operates to perform voice processing functionality and supply voice processing functionality to either side of a call path. For example the intelligent peripheral may comprise specific features such as fax demodulation and echo cancellation, in which simultaneous access to both directions of a speech path is required. For some functions of the intelligent peripheral, for example announcement playouts, uni-directional access to a call-path may be sufficient. Universal tone generator device 508 and universal tone receiver device 509 may be pooled resources operating to detect MF or DTMF tone-based signaling, and for generating tones. The implementation illustrated in FIG. 5 comprises an example where the volume of traffic and types of traffic through an exchange justifies having a plurality of network service provider devices on a same site, co-located in adjacent or same racks. However, in principle, ATM fabric 500 may be replaced by an ATM network extending geographically over an unbounded distance.

An overview of operation of the network architecture illustrated in FIG. 5 now follows. It will be appreciated that the architecture is capable of bi-directional operation, and incoming and outgoing calls may be received and dispatched in either direction, between a source and destination of a dialed call.

Incoming TDM calls in a first direction either from trunks, or from circuits are input at first TDM interface 503, and are converted to ATM cell streams by first ATM adaptation device 501 as is known in the art. The ATM cells generated by first ATM adaptation device 501 are entered into conventional ATM fabric 500 which routes the cell streams to second ATM adaptation device 502, where the cell stream is reconverted back to a TDM circuit or trunk, and communicated through second TDM interface 504 onto an outgoing circuit or trunk. ATM fabric 500 acts as a straight through switch connecting an incoming circuit or trunk channel to an outgoing channel, and vice versa for the other channel of the circuit or trunk. Additionally, ATM fabric 500 can duplicate a said cell stream comprising a said channel, and direct it to a network service provider, and/or can substitute an ATM cell stream generated by a network service provider device for a cell stream comprising a through a channel of a circuit or trunk., or can direct an ATM cell stream to an appropriate network service provider which can provide a service either uni-directionally or bi-directionally along the circuit or trunk.

Although an ATM fabric is illustrated as a switching means in FIG. 5 as the best mode herein, in the general architecture disclosed herein, the switching means may comprise a general circuit switched network capable of switching channels and circuits in the form of of packet streams. In general, an incoming call may be converted to a packet stream, eg a stream of ATM cells, diverted through a circuit switched transport resource, capable of carrying packet streams, for example ATM fabric 500 or alternatively an ATM network, to one or a plurality of network service provider devices 506-509 located either adjacent the ATM fabric, or alternatively anywhere in the ATM network, the ATM cells being redirected to second ATM adaptation 502, having network services added to the call, and outgoing through second TDM interface 504.

In the best mode illustrated in FIG. 5, universal tone receiver 508 may detect significant messaging from the originating source of the call. Universal tone receiver 508 may be permanently provided to a call in either direction of the call to provide tone recognition for activating specific dial tone activated services, for example in-band tone activated tone services, such as "1471" services, whereby by dialing the digits 1471 a last dialed call may be announced to a caller. Universal tone generator 509 provides tones to the originating side of the call.

Figure 6:
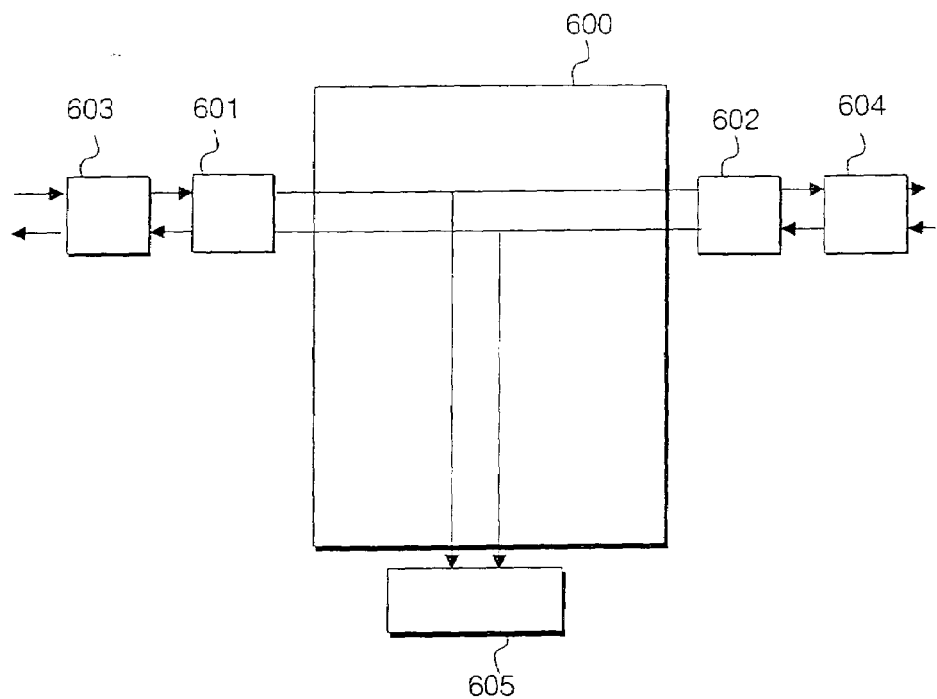
FIG. 6 illustrates schematically a first mode of operation of the exchange architecture of FIG. 5 for providing a universal tone receiver service to a call carried on a TDM circuit.

Referring to FIG. 6 herein there is illustrated schematically implementation of a "T" connection of a call to a universal tone receiver 605 via ATM fabric 600. The "T" connection to the universal tone receiver 605 is created in ATM by use of a multi-cast function. In the multi-cast function, the incoming trunk or circuit is input into first ATM adaptation 601 via first TDM interface 603, and enters ATM fabric 600 as a stream of 53 byte ATM cells and output to second ATM adaptation device 602 where the cell stream is adapted to a time division multiplex signal which is output via second TDM interface 604 to a destination of the call. Simultaneously, the through-cell system is copied to create a second cell stream and the second, copied stream of ATM cells is fed continuously to the universal tone receiver device 605. A virtual circuit is created between first ATM adaptation 601 and second ATM adaptation 602, and another virtual circuit is created between first ATM adaptation 601 and universal tone receiver 605. Universal tone receiver device 605, which operates in ATM mode, monitors tone dial signals carried within the ATM cell stream for pre-determined dial tone messages, eg numbers dialed, on a continuous basis without interrupting the passage of the call through the ATM fabric 600 between first and second TDM interfaces.

Figure 7:
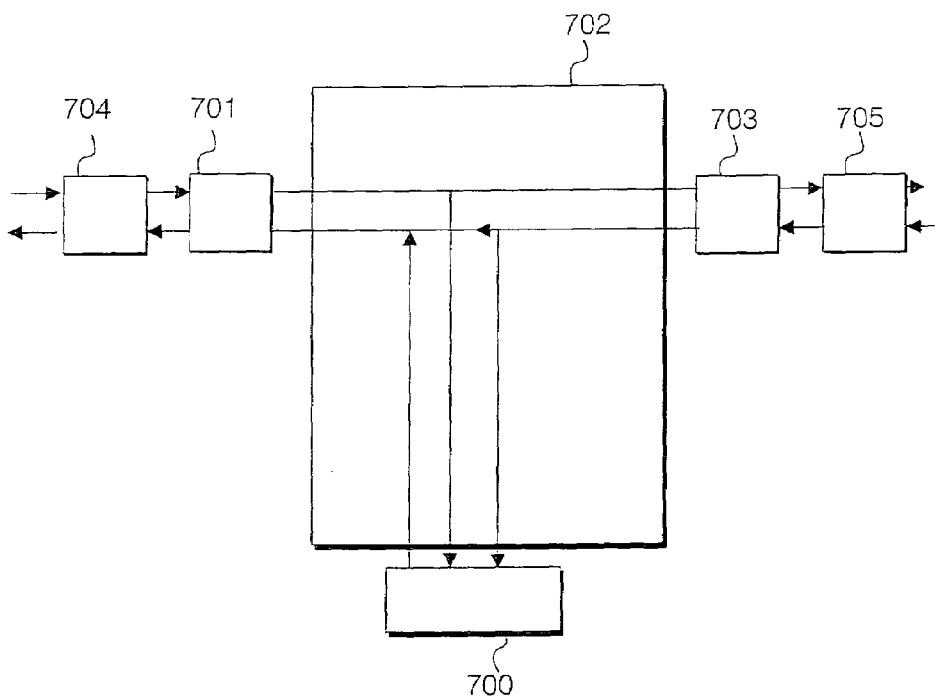
FIG. 7 illustrates schematically a second mode of operation of the exchange architecture of FIG. 5, for providing a universal tone receiver service to a call on a TDM circuit.

Referring to FIG. 7 herein, there is shown a second implementation of connection of a universal tone receiver to a call.

In this implementation, universal tone receiver 700 monitors a call on a circuit or a trunk in both directions, from source to destination and from destination to source. A first channel of a circuit connection extends between first ATM adaptation 701, through ATM fabric 702, in which an ATM cell stream comprising a channel of a first virtual circuit is multicast, that is to say copied to create a first cell stream duplicated and sent over to second ATM adaptation 703 and to universal tone receiver 700. Similarly, in the opposite direction of the virtual circuit, a second channel extending between second ATM adaptation 703 and first ATM adaptation 701 is multicast, by duplicating a second stream of ATM cells, and connecting the duplicated second stream from second ATM adaptation 703 to universal tone receiver 700 in another multicast operation. Using the second configuration shown in FIG. 7, communications which require recognition of dial tones in either direction on a call, for example between two fax modems may be routed to the universal tone receiver 700 without incurring a switching delay for switching the complete call to the universal tone receiver, but rather creation of a connection between each channel of a circuit and the universal tone receiver, in parallel with connections between incoming and outgoing ports of an ATM fabric, by means of duplicating an ATM cell stream within the ATM fabric may allow continuous monitoring of both directions of a call, without incurring any additional switching delay in switching the call to the universal tone receiver.

During specific phases of a call, tones may be received on different through channels of the circuit supporting the call from either side of a call, that is to say either source or destination. For instance, from the call originating side a start of a fax call may comprise a first set of tones in a first direction which are sent both to the destination, and to the universal tone receiver by virtue of creation of a duplicated cell stream directed to the universal tone receiver in addition to the cell stream directed to an output ATM adaptation device, and during another phase of the call, the exchange may similarly monitor tones received from the other (destination) side of the call. Such operation is significant in situations, for example where the exchange itself applies bandwidth compression to voice calls, since the detection of fax modem tones on both sides of a call indicates to the exchange that the call is a fax call, and voice compression cannot be applied to that call, because the bandwidth applied by a fax data call is greater than that required by a compressed voice call. This compares with the equivalent situation in the prior art case, wherein multiple calls would be set up at each exchange, such that at each exchange the call is routed to a universal tone receiver and then rerouted back to an outgoing part of the exchange, thereby incurring a delay in switching the call to the relevant universal tone receiver at each exchange. By comparison, in the specific implementations of the best modes of the present invention, a call between source and destination is not routed through the universal tone receiver, but the universal tone receiver receives a copy of the cell stream(s) comprising the call, which terminates at the universal tone receiver, leaving the through cell stream(s) between source and destination unaffected.

Figure 8:
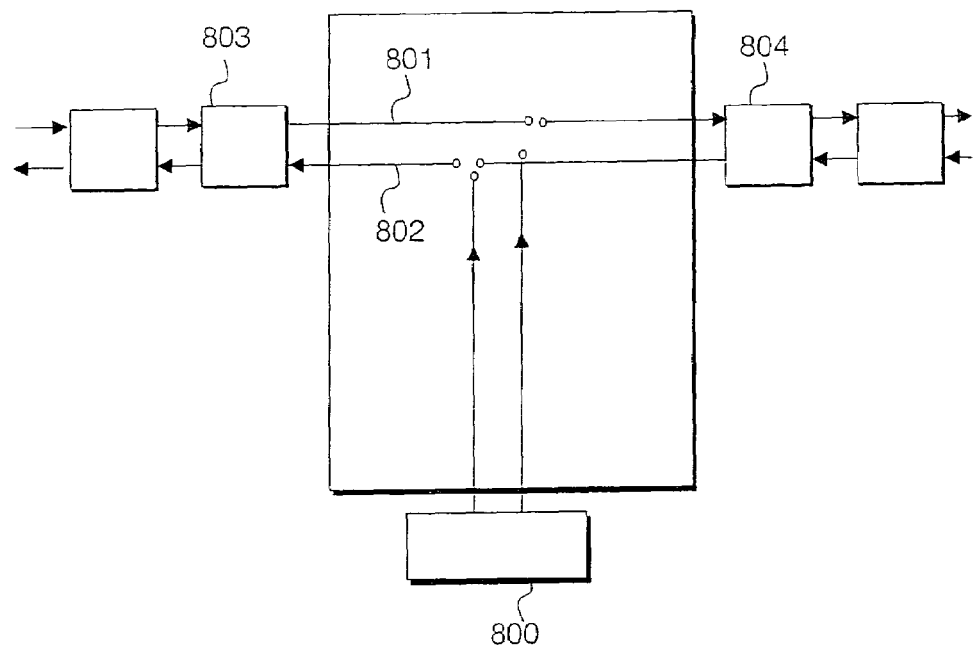
FIG. 8 illustrates schematically a third mode of operation of the exchange architecture of FIG. 5 for providing a network announcement service to a call carried on a TDM circuit or trunk.

Referring to FIG. 8 herein, there is illustrated schematically a third mode of operation of the exchange architecture illustrated in FIG. 5, in which a network announcer device 800 outputs an announcement message in either direction of a call, either towards a source of the call, or towards a destination of the call, replacing other traffic carried on a corresponding channel of the call. The network announcement message is switched into either channel of the call to replace the traffic data by the ATM fabric. In either case, the network announcement message comprises a short term temporary connection of ATM cells carrying the network announcement data which replace through ATM cell streams 801 or 802 between first ATM adaptation 803 and second ATM 804 in the appropriate direction. Since the through ATM cell stream is not re-directed to the network announcer, there is no inherent delay in substituting an ATM cell stream from the network announcer for the ATM cell stream carrying the data traffic between source and destination.

This compares with the prior art exchange architecture, in which the complete call would need to be switched through the network announcer in order to apply the network announcement to the call, thereby incurring a switching delay in switching the call to the network announcer. Further, on termination of the network announcement message, the circuit needs to be reconnected between source and destination from the network announcer, thereby incurring a further switching delay. In the present mode of operation of the present architecture, disclosed herein such switching delay is avoided.

Figure 9:
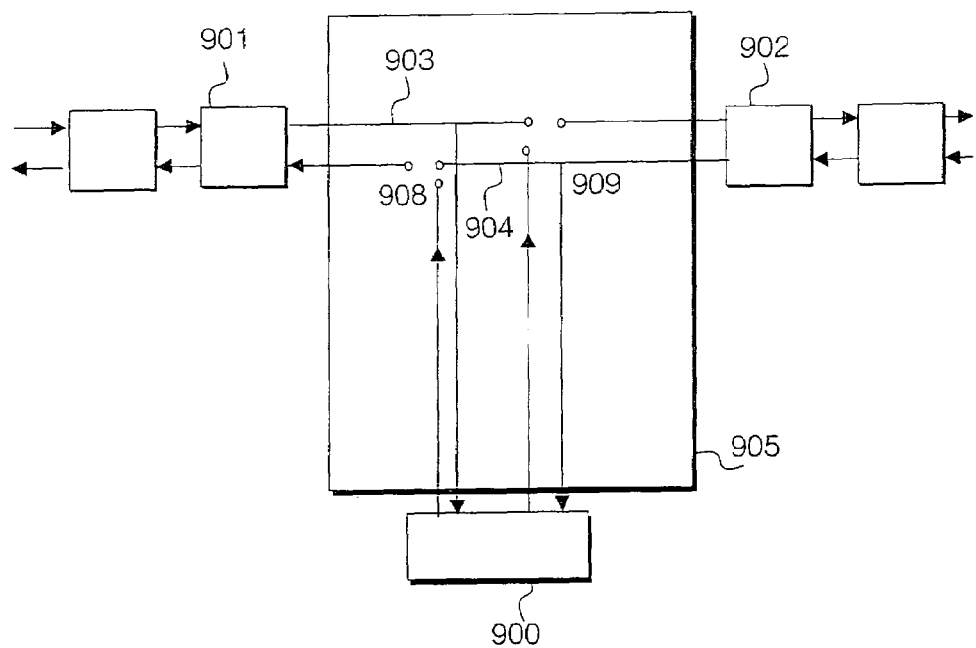
FIG. 9 illustrates schematically a fourth mode of operation of the exchange architecture of FIG. 5 for providing a network service supplied by an intelligent peripheral device to a TDM circuit.

Referring to FIG. 9 herein, there is illustrated schematically operation of the exchange architecture of FIG. 5 for connecting a call with an intelligent peripheral device 900. The intelligent peripheral may have an ability to play announcements, perform telecom measurements, perform DTMF detection, handle fax demodulation/remodulation, and/or record and replay voice. To supply these functions, intelligent peripheral 900 may access both sides of a call, at first ATM adaptation 901 and second ATM adaptation 902. The access to the two channels of a circuit supporting a call required by the intelligent peripheral 900 depends upon the function which intelligent peripheral 900 supplies to the call. For example, fax demodulation requires tones to be sent from an incoming call side as well as tones to be returned from an outgoing call side in order to perform a full demodulation/remodulation task. Other functions such as voice play and record require both directions of an incoming call to be routed to an intelligent peripheral 900. A circuit comprising first and second through channels 903, 904 between first ATM adaptation 901 and second ATM adaptation 902 in either direction, which are carried by corresponding respective first and second ATM cell streams across ATM fabric 905 are accessed by means of switching either a first generated ATM cell stream generated by intelligent peripheral 900 in a first through direction between input and output through ports of the ATM fabric, or by switching a second generated ATM cell stream in a second through direction. First cell stream between first ATM adaptation 901 and second ATM adaptation 902 in a first direction may be copied and the copy cell stream routed to intelligent peripheral 900. Similarly, second through cell stream adaptation 902 and first ATM adaptation 901 may be copied and routed to intelligent peripheral 900 without incurring any switching delay to the second through ATM cell stream. Similarly intelligent peripheral 900 may substitute an ATM cell stream carrying a service for first or second through ATM cell streams via first and second cell stream switches 907, 908 respectively, in either direction of the call. Multicasting of ATM cell streams, or substitution of ATM cell streams for connecting to intelligent peripheral 900 incurs lower delay than in a corresponding prior art case, in which a complete call is switched to an intelligent peripheral device.

Similarly, substitution of an ATM cell stream generated by intelligent peripheral 900 may be carried out in ATM fabric 905 without incurring switching delay to either first or second through cell streams. Intelligent peripheral devices may supply services such as voice mail, wherein after a predetermined number of rings, an intelligent peripheral intersects a call and provides a voice message giving information as to the whereabouts of an individual and then gives an opportunity for recording of a message.

Figure 10:
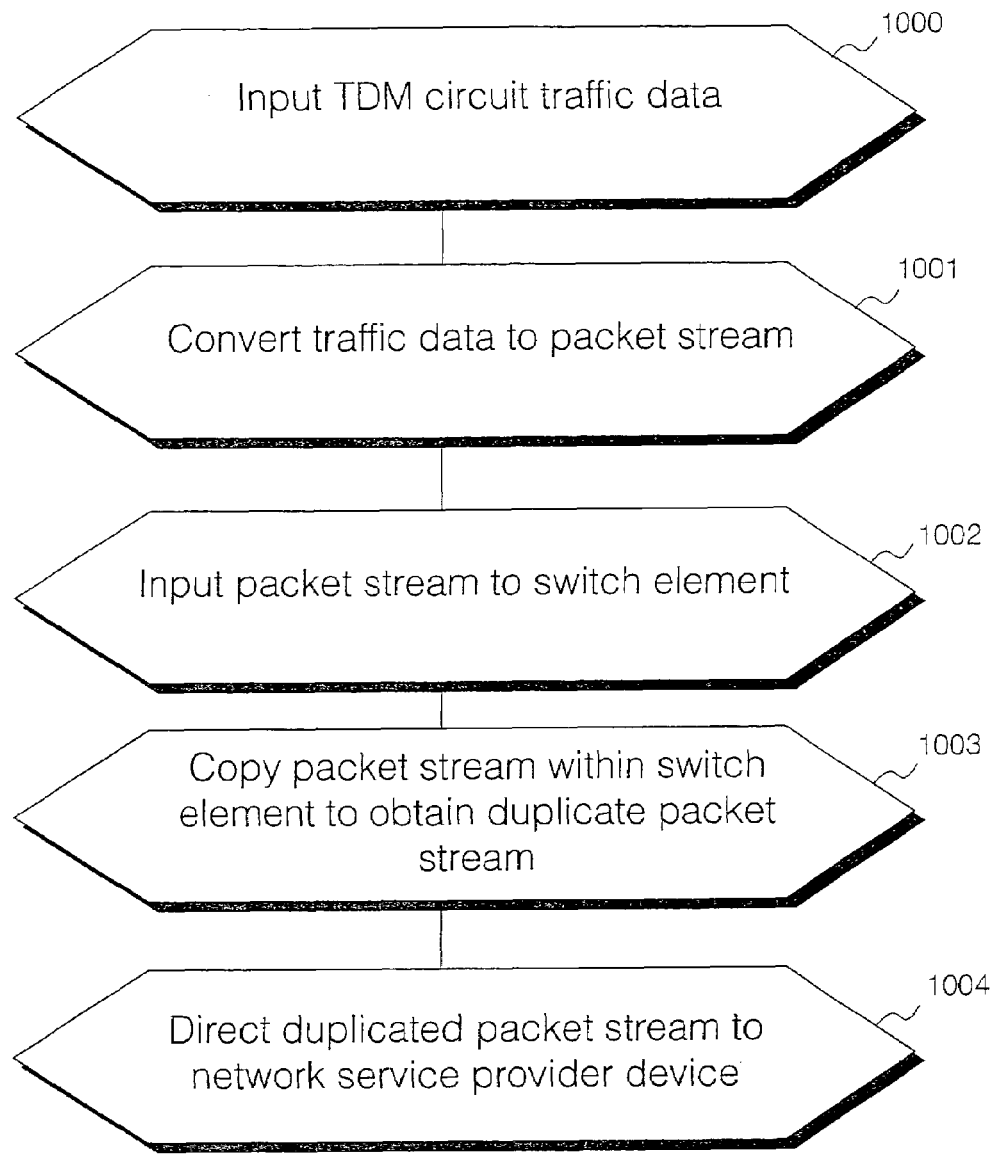
FIG. 10 illustrates schematically process steps in a generalized method of operation of the generalized network of FIG. 4 and exchange architecture of FIG. 5.

Referring to FIG. 10 herein, there is illustrated schematically process steps of a generalized method of operation of the network architecture of FIG. 4, and the exchange architecture of FIG. 5. The process steps operate in real time on a continuous basis for each channel of a pluarlity of circuits and/or trunks across the network or exchange. In step 1000, a plurality of time division multiplex circuits or trunks carrying traffic data are interfaced, using TDM interface means to an ATM adaptation device operating an ATM adaptation layer for conversion of time division multiplex signals to data payloads of a plurality of packets or cells, eg ATM cells, resulting in a converted stream of packets in step 1001. A plurality of streams of packets are input into a packet switch element in step 1002. Within the packet stream switch element, one or a plurality of packet streams may be duplicated, by copying the packets to provide a duplicate, parallel packet stream. The duplicate packet stream is directed to a network service provider device on a continuous basis in step 1004, without incurring any delay to the original packet stream, which passes through the packet switch element. The packet switch element may comprise a packet switching fabric, eg a ATM switch fabric, or a plurality of packet switching elements, eg a complete ATM network.

Figure 11:
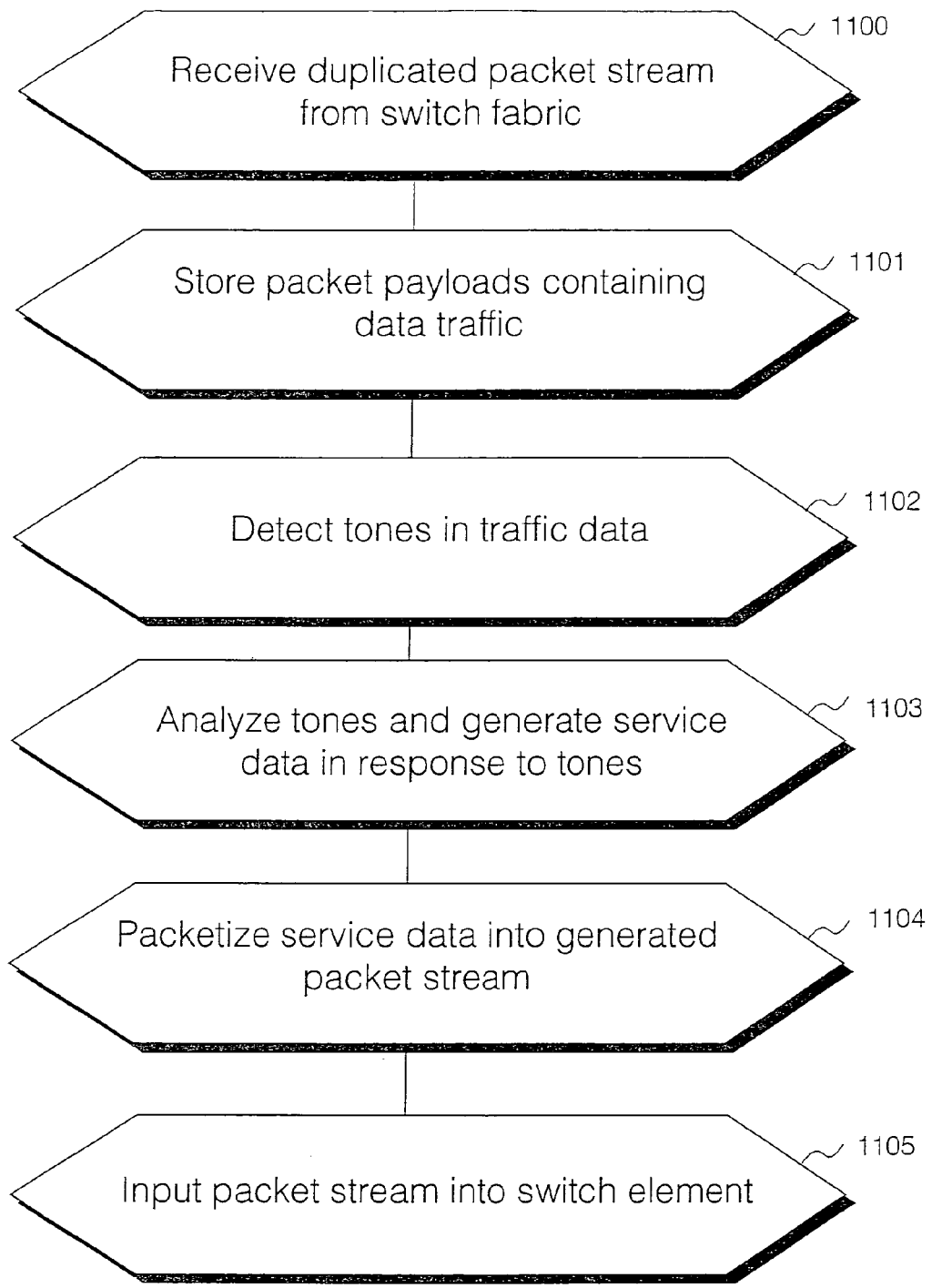
FIG. 11 illustrates schematically process steps for a general method of operation of a network service provider device, for example an intelligent peripheral device located within the generalized network architecture portion of FIG. 4, or the exchange architecture of FIG. 5.

Referring to FIG. 11 herein, there is illustrated schematically process steps for a generalized method of operation of a network service provider device within the architectures of FIGS. 4 and/or 5. The generalized method of operation of FIG. 11 applies to a network service provider which is capable of handling data traffic arriving in the form of a packet stream, and for a network service provider device which generates service data which is output from the network service provider device in a packet stream. In step 1100, the network service provider may receive a duplicated packet stream from a switch fabric containing traffic data of a circuit and/or trunk. A plurality of packet streams may be received, one packet stream per channel of each circuit. In step 1101, the packet payloads containing the data traffic may be stored internally in the network service provider device, and in the case of a network service provider device which detects tones, the data payloads of the packet streams are analyzed and tone data is detected from the traffic data in step 1102. Tones may be analyzed in step 1103, and the network service provider generates service data in response to and corresponding to a pre-determined set of service provision rules stored internally in the network service provider in step 1103. The service data provided by the network service provider device is packetized in step 1104 into a packet stream which is issued from the network service provider device into the switch element in step 1105, whereupon it is switched into a corresponding packet stream passing through the switch fabric in step 1105. Switching of the packet stream containing network service data into the appropriate circuit channel packet stream occurs without switching the circuit channel stream through the network service provider device, thereby avoiding a switching delay which would otherwise be incurred through circuit channel packet stream to the network service device.

Figure 12:
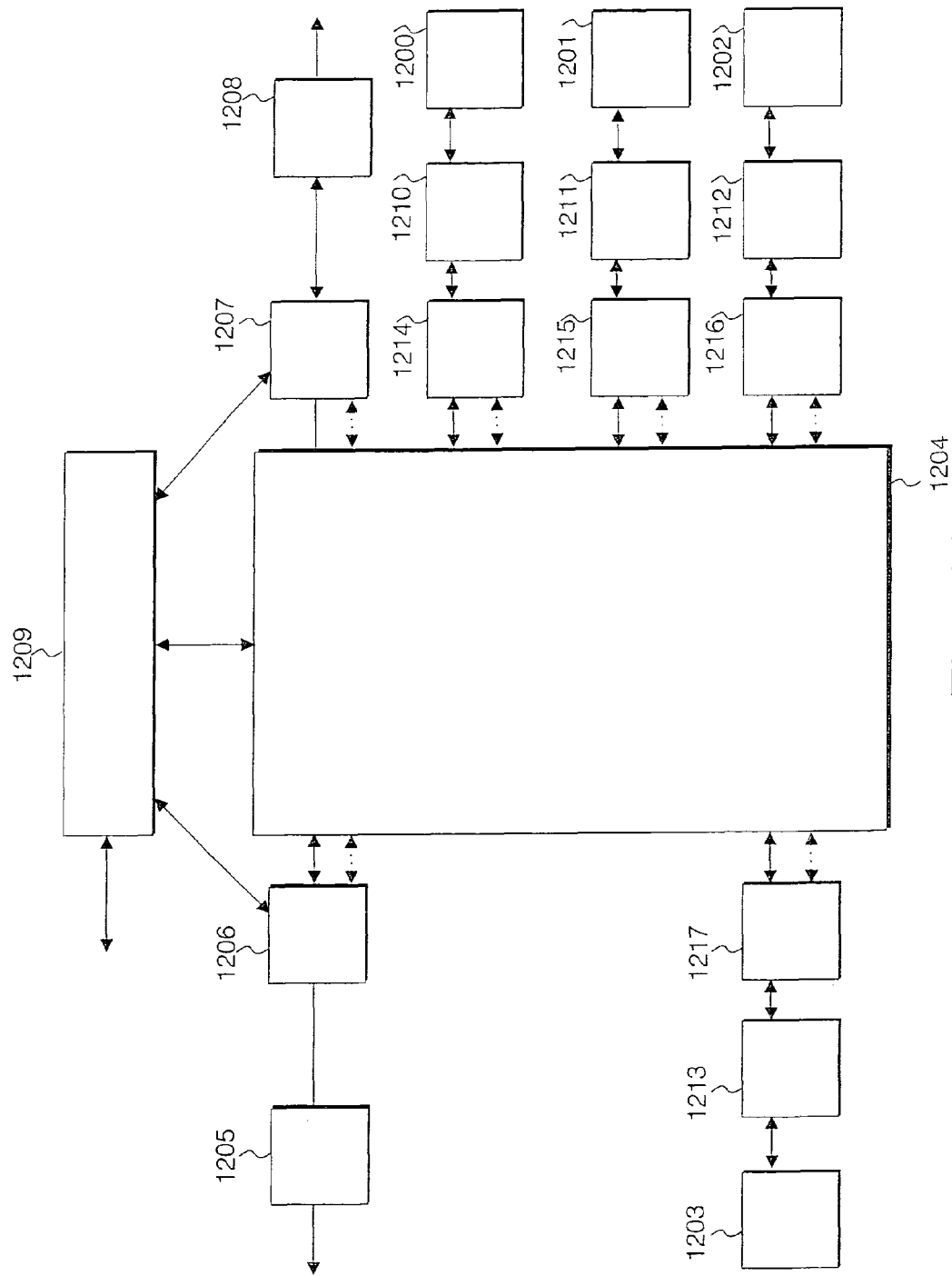
FIG. 12 illustrates a modification of the exchange architecture of FIG. 5, in which a plurality of legacy network service provider devices are each provided with a packet adaptation means, and an interface between a time division multiplex mode and a packet adaptation means.

Referring to FIG. 12 herein, there is illustrated schematically an alternative architecture for an exchange, in which a plurality of time division multiplex circuits and/or trunks pass through a switch fabric capable of handling a plurality of packet streams and are provided with network services from a plurality of legacy network service provider devices 1200-1203, eg a universal tone receiver, a universal tone generator, a network announcer, and/or one or more intelligent peripheral devices. The network service provider devices may comprise legacy equipment operating to accept time division multiplex circuits or trunks. The exchange architecture comprises the packet switch fabric 1204; an input TDM interface 1205; a first conversion means 1206 for converting TDM circuit channels to packet streams; a second conversion means 1207 for converting between packet streams and TDM circuits and trunks; a second interface means 1208 for interfacing between second conversion means and a plurality of TDM circuits and/or trunks; a control means 1209 for controlling the conversion means and switch fabrics; and each network service provider device 1200-1203 being supplied with a corresponding respective TDM-packet stream convertor device 1210-1213, and each conversion device associated with a network service provider being provided with a TDM-packet stream interface 1214-1217.

General operation of the embodiment illustrated in FIG. 12 is similar to that previously described herein, except a packet stream entering and exiting from the packet switch fabric 1200 to an appropriate network service provider device 1201-1204 undergoes re-conversion from a packet steam, via a said TDM-packet stream interface, before entering legacy network service provider device 1201-1204 operating to provide network service data in time division multiplex format, which is then output back through the appropriate corresponding respective TDM interface and conversion means into the packet switch element 1200 for addition to the plurality of through packet streams passing through the packet stream switching fabric 1200 similarly as hereinabove described.

The invention claimed is:

1. A telecommunications system comprising:
a packet mode switch fabric;
a source device and a destination device, said source device being connected to said destination device by a channel through the switch fabric and traffic data from said source device to said destination device being carried as a stream of packets on said through channel; and
a switch means for replicating said stream of packets and communicating said replicated packet stream to a network service provider device located within said packet mode switch fabric over a channel connecting the through channel to the network service provider device, said network service provider device being arranged to process said replicated packet stream and to generate, in response to processing said replicated packet stream, service data relating to said traffic data and to provide said service data in a packet stream to said switch means for switching into said stream of packets being carried on said through channel, wherein the network service provider device is arranged to generate the service data in accordance with a pre-determined set of service provision rules stored internally in the network service provider device.

2. A telecommunications system as claimed in claim 1, wherein said stream of packets on said through channel comprises a call between the source device and the destination device and wherein the switch means for replicating the stream of packets is configured to only perform replication of the stream of packets in association with a call activity.

3. A telecommunications system as claimed in claim 2, wherein the switch means for replicating the stream of packets is configured to perform replication of the stream of packets in association with a call activity comprising one of tone reception/generation, facsimile demodulation, echo cancellation and call announcement generation.

4. A telecommunications system as claimed in claim 1, wherein traffic data is carried bi-directionally between the source device and the destination device by first and second packet streams on respective first and second channels and said switch means for replicating replicates each of said first and second packet streams and communicates the replicated streams to the network service provider device on respective connecting channels.

5. A telecommunications system as claimed in claim 1, wherein said switch means for replicating the stream of packets comprises a switching device.

6. A telecommunications system as claimed in claim 1, wherein the switch fabric comprises a packet mode switch.

7. A telecommunications system as claimed in claim 1, wherein said switch fabric comprises a network having:
a plurality of interconnected switching devices; and an access network comprising a plurality of circuits and a plurality of network service provider devices connected to said switching devices, wherein said switch means for replicating the stream of packets comprises one of said switching devices.

8. A telecommunications system as claimed in claim 7, wherein said through channel comprises a packet stream part of an end to end circuit across the network, said circuit extending through a time division multiplexed (TDM) access channel on a source device side of the network, through said packet stream channel and through a TDM access channel on a destination device side of the network, said switching devices including adaptation devices for converting traffic data between a TDM mode and a packet stream mode.

9. A telecommunications system as claimed in claim 8, wherein said end to end circuit between said source device and said destination device comprises first and second channels carrying respective first and second packet streams and said switch means for replicating the packet stream replicates each of said first and second packet streams and directs each of them on respective connecting channels to the network service provider device.

10. A telecommunications system as claimed in claim 1, wherein said switch means for replicating the stream of packets broadcasts said replicated stream of packets to a plurality of network service provider devices on respective connecting channels.

11. A telecommunications system as claimed in claim 1, wherein said network service provider device comprises a voice processing device.

12. A telecommunications system as claimed in claim 1, wherein said network service provider device comprises an intelligent peripheral device.

13. A telecommunications system as claimed in claim 1, wherein said through channel comprises a circuit switched connection through the switch fabric between the source device and the destination device.

14. A telecommunications system as claimed in claim 1, wherein the network service provider device is co-located with the switch means.

15. A telecommunications system comprising:
a circuit switched switching network;
a source device and a destination device, said source device being connected to said destination device by a circuit switched connection through the switching network, said circuit switched connection having a packet mode portion for carrying traffic data from the source device to the destination device as a packet stream; and
a switch element for replicating said stream of packets at said packet mode portion of the circuit switched connection and communicating said replicated packet stream to another circuit at said packet mode portion of the circuit switched connection, said another circuit comprising a service provider circuit, said service provider circuit being arranged to process said replicated packet stream and to generate, in response to processing said replicated packet stream, service data relating to said traffic data and to provide said service data in a packet stream to said switch element for switching into said stream of packets being carried on said packet mode portion, wherein the service provider circuit is arranged to generate the service data in accordance with a pre-determined set of service provision rules stored internally in the network service provider circuit.

16. A telecommunications system as claimed in claim 15, wherein said stream of packets on said packet mode portion comprises a call between the source device and the destination device and wherein the switch element for replicating the stream of packets is configured to only perform replication of the stream of packets in association with a call activity.

17. A telecommunications system as claimed in claim 16, wherein the switch element for replicating the stream of packets is configured to perform replication of the stream of packets in association with a call activity comprising one of tone reception/generation, facsimile demodulation, echo cancellation and call announcement generation.

18. A telecommunications system as claimed in claim 15, wherein the switch element for replicating the stream of packets is configured to communicate said replicated stream of packets to a network service provider device on a packet mode circuit connecting the network service provider device to the packet mode portion of the circuit switched connection.

19. A telecommunications system as claimed in claim 18, wherein the network service provider device comprises a voice processing device.

20. A telecommunications system as claimed in claim 18, wherein the network service provider device is co-located with the switching element.

21. A telecommunications system as claimed in claim 18, wherein the network service provider device comprises an intelligent peripheral device.

22. A telecommunications system as claimed in claim 15, wherein traffic data is carried bi-directionally between the source device and the destination device by first and second packet streams on respective first and second channels of the packet mode portion of the circuit switched connection and said switch element for replicating replicates each of said first and second packet streams and communicates the replicated streams to the network service provider device on respective channels of the another circuit.

23. A communications network switch capable of establishing a circuit switched connection for the transport of packets comprises:
a plurality of through channels capable of carrying packet streams through the switch;
a plurality of adaptation devices for adapting incoming traffic data flows to respective packet streams and supplying said streams to respective through channels;
a switch element for replicating a packet stream on a selected through channel and communicating the replicated packet stream to another channel; and
a circuit for receiving said replicated packet stream, said circuit being arranged to process said replicated packet stream and to generate, in response to processing said replicated packet stream, service data relating to traffic data of said replicated packet stream and to provide said service data in a packet stream to said switch element for switching into said packet stream carried on said selected through channel, wherein the switch element for replicating the packet stream communicates the replicated packet stream to a plurality of other channels and the network service provider device generates the service data in accordance with a pre-determined set of service provision rules stored internally in the network service provider device.

24. A switch as claimed in claim 23, wherein each respective packet stream on a through channel comprises a call between a source device and a destination device and wherein the switch element for replicating a stream of packets is configured to only perform replication of that stream of packets in association with an activity of a call comprising said stream of packets.

25. A switch as claimed in claim 24, wherein the switch element for replicating the stream of packets is configured to perform replication of a stream of packets in association with a call activity comprising one of tone reception/generation, facsimile demodulation, echo cancellation and call announcement generation.

26. A switch as claimed in claim 23, wherein the another channel comprises a packet mode channel which connects the through channel whose packet stream is being replicated to the circuit for receiving said replicated packet stream, said circuit comprising a network service provider device.

27. A switch as claimed in claim 26, wherein said network service provider device comprises a voice processing device.

28. A switch as claimed in claim 27, wherein the voice processing device is co-located with the switch element.

29. A switch as claimed in claim 23, wherein traffic data is carried bi-directionally on said circuit switched connection by first and second packet streams on respective first and second channels of said plurality of through channels and said switching element replicates each of said first and second packet streams and supplies the replicated packet streams to respective connecting channels.

30. A method of replicating communications traffic data on a communications circuit between a source device and a destination device, comprises the steps of:
 providing a communications circuit between said source device and said destination device through a switch fabric, said circuit comprising a packet stream channel in said switch fabric;
 providing a packet mode channel connecting said communications circuit to a network service provider device located within said switch fabric;
 replicating a stream of packets carried on said communications circuit;
 supplying said replicated packet stream to the network service provider device;
 processing said replicated packet stream at said network service provider device in accordance with a pre-determined set of service provision rules stored internally in the network service provider device and generating in response to said processing service data relating to said traffic data;
 providing said service data in a packet stream to a switching element for switching into said stream of packets being carried on said communications circuit.

31. A method as claimed in claim 30, wherein said stream of packets on said communications circuit comprises a call between the source device and the destination device and wherein the step of replicating the stream of packets includes only performing replication of the stream of packets in association with a call activity.

32. A method as claimed in claim 31, wherein replication of the stream of packets is performed in association with a call activity comprising one of tone reception/generation, facsimile demodulation, echo cancellation and call announcement generation.

33. A method as claimed in claim 30, wherein the step of replicating traffic comprises replicating traffic carried bi-directionally between the source device and the destination device by first and second packet streams on respective first and second channels and communicating each of the replicated first and second packet streams to the network service provider device on respective connecting channels.

34. A method as claimed in claim 30, wherein the communication circuit comprises a time division multiplexed (TDM) portion and a packet mode portion and the method includes the steps of:
 converting an incoming traffic data flow from a TDM mode to a packetised mode;
 inputting a stream of packets containing said traffic data flow to the switching element;
 transporting said packet stream between an input and an output of the switching element; and
 replicating said packet stream within the switching element.

35. A method as claimed in claim 30, wherein the step of supplying the replicated packet stream to a network service provider device comprises supplying said replicated stream of packets to a voice processing device.

36. A method of replicating a traffic packet stream in a circuit switched communications network comprises the steps of:
 providing a circuit switched connection between a source device and a destination device through a network switch fabric;
 transporting traffic on a packet mode portion of said circuit switched connection as a stream of packets;
 replicating said stream of packets at said packet mode portion of the circuit switched connection;
 supplying said replicated stream of packets to another circuit located at said packet mode portion of the circuit switched connection, said another circuit comprising a service provider circuit;
 processing said replicated packet stream at said service provider circuit in accordance with a pre-determined set of service provision rules stored internally in the service provider circuit and generating in response to said processing service data relating to traffic data;
 providing said service data in a packet stream to a switching element for switching into said stream of packets being carried on said packet mode portion.

37. A method as claimed in claim 36, wherein said stream of packets on said packet mode portion comprises a call between the source device and the destination device and wherein the step of replicating the stream of packets includes only performing replication of the stream of packets in association with a call activity.

38. A method as claimed in claim 37, wherein replication of the stream of packets is performed in association with a call activity comprising one of tone reception/generation, facsimile demodulation, echo cancellation and call announcement generation.

39. A method as claimed in claim 36, wherein said step of replicating the stream of packets is performed by a switching element.

40. A method as claimed in claim 36, wherein said replicated stream of packets is communicated to a network service provider device on a packet mode circuit connecting the network service provider device to the packet mode portion of the circuit switched connection.

41. A method as claimed in claim 40, wherein the step of supplying the replicated packet stream to a network service provider device comprises supplying said replicated stream of packets to a voice processing device.

42. A method as claimed in claim 36, wherein the step of replicating traffic comprises replicating traffic data carried bi-directionally between the source device and the destination device by first and second packet streams on respective first and second channels of the packet mode portion of the circuit switched connection and supplying each of the replicated first and second packet streams to respective channels of the another circuit.

* * * * *